United States Patent [19]

Pokhodnya et al.

[11] 3,710,073

[45] Jan. 9, 1973

[54] WELDING WIRE

[75] Inventors: Igor Konstantinovich Pokhodnya; Valery Nikolaevich Shlepakov; Vladimir Fedorovich Alter, all of Kiev, U.S.S.R.

[73] Assignee: Institut Electrosvarki Imeni E. O. Patena Akademie Nauk UKR SSR, Kiev, U.S.S.R.

[22] Filed: Feb. 12, 1970

[21] Appl. No.: 11,006

[30] Foreign Application Priority Data

Feb. 25, 1969 U.S.S.R. .................................1305592

[52] U.S. Cl. .......................219/146, 148/24, 117/202
[51] Int. Cl. .................................................B23k 35/24
[58] Field of Search ......148/24, 23, 25, 26; 219/146; 117/205, 202, 206, 207

[56] References Cited

UNITED STATES PATENTS

| 2,474,787 | 6/1949 | Landis et al. | 148/24 |
| 3,539,765 | 11/1970 | Duttera et al. | 219/146 |
| 2,155,307 | 4/1939 | Hagemann et al. | 148/25 |
| 3,119,179 | 1/1964 | Gale | 148/26 X |

FOREIGN PATENTS OR APPLICATIONS

| 1,078,697 | 8/1967 | Great Britain | 148/24 |

OTHER PUBLICATIONS

Evans, The Corrosion and Oxidation of Metals: First Supplementary Volume, St. Martin's Press, N.Y., 1968, pp. 201 and 202.
LaQue, Corrosion Resistance of Metals and Alloys, Reinhold Publishing Corp., N.Y., 1963, p. 148.
Putilova et al., Metallic Corrosion Inhibitors, Pergamon Press, N.Y., 1960, pp. 159, 160, 163 and 164.
Drinberg et al., Technology of Non–Metallic Coating, Pergamon Press, N.Y., 1960, p. 29.

Primary Examiner—G. T. Ozaki
Attorney—Waters, Roditi, Schwartz and Nissen

[57] ABSTRACT

Welding wire for steel welding and built-up welding, consisting of a steel tube with a powder core including a vapor-phase inhibitor of corrosion.

1 Claim, No Drawings

WELDING WIRE

The invention relates to welding materials, and more specifically to filling wires used for steel welding and built-up welding, that consist of a steel sheath with a core.

Composite wires for steel welding and built-up welding, consisting of a steel sheath with a core comprising iron powder, powders of metals and their alloys, gas forming and slag forming materials, and materials stabilizing the arc, are known in the art.

Among these conventional welding wires used most widely are those whose steel sheath has a joint in the place where the strip edges are connected together. Under storage conditions moisture penetrates through leakages in the sheath joint causing progressive corrosion of the sheath metal, iron powder, and the powders of metals and their alloys serving as constituents of the core.

Corrosion of the steel sheath and the metal constituents of the core is an irreversible process rendering the filling wire unfit for welding.

Containers used in the industry for storing and transporting welding wire do not protect it from rusting.

Air-tight packing cannot completely prevent moisture penetration into the wire either, since between production and packing the wire remains unprotected in storage. Besides, after unpacking the wire before using it in the welding apparatus, it again becomes unprotected against the atmosphere, which leads to corrosion development and loss of the welding and production properties of the wire.

An object of the present invention is to eliminate the indicated disadvantage.

An important object of the present invention is to provide a welding wire consisting of a steel sheath with a powder core, wherein the core would have a composition protecting the steel tube and the metal constituents of the wire from corrosion, at the same time maintaining high welding and production properties thereof.

Said objects are achieved by means of a welding wire whose core, besides the iron powder, powders of metals and their alloys, gas forming and slag forming materials, and arc stabilizing materials, comprises, according to the invention, a powdered vapor-phase, corrosion inhibitor, the amount of which is 0.01–0.50 percent of the total weight of the welding wire.

A favorable solution of this problem is attained in the case when the vapor-phase corrosion inhibitor is cyclohexylamine chromate (in powder form).

No less advisable is the use of dicyclohexylamine nitrite (in powder form) as the vapor-phase corrosion inhibitor.

Owing to the fact that the core of the proposed welding wire has in its composition, according to the invention, a vapor-phase corrosion inhibitor, the steel tube of the wire and the metal constituents of the core are securely protected against corrosion, which helps to maintain high welding and production properties of the wire.

The present invention will be more clearly understood from the explanations and exemplary embodiments thereof given in the following description.

The proposed filler wire for steel welding and built-up welding consists of a steel sheath with a core comprising iron powder, powders of metals and their alloys, gas forming and slag forming materials, and arc stabilizing materials. According to the invention, besides the indicated constituents, the core comprises a powder of a vapor-phase corrosion inhibitor, the amount of which is 0.01–0.50 percent of the total weight of the welding wire.

Thus the sheath of the welding wire forms a closed space for the vapor-phase corrosion inhibitor uniformly distributed in the core, which creates the most favorable conditions for protecting the metal constituents of the wire.

To realize the protective properties of the vapor-phase corrosion inhibitor, its amount in the core should be not less than 0.01 percent of the wire weight. Employed as the vapor-phase corrosion inhibitor can be cyclohexylamine chromate or, no less successfully, dicyclohexylamine nitrite.

The efficiency of the proposed welding wire in work is proved by the following examples.

Example 1

A conventional welding wire, whose core enclosed in a steel sheath comprised iron powder, powders of ferromanganese and ferrosilicon, as well as of ore and mineral constituents (rutile concentrate, fluorspar, marble, arc stabilizer), was placed into an air conditioning chamber (with a "sea fog" atmosphere). After keeping the wire in this chamber for 24 hours, the surface of the steel sheath (of the welding wire) and the metal particles of the core were found covered with rust. The process of welding with such wire was accompanied with significant splashes of the electrode metal, unfavorable formation of the welds, and porosity of weld metal. As a consequence, the filling wire proved to be unfit for welding or built-up welding.

Then there was placed in said chamber a welding wire according to the invention whose core included a vapor-phase corrosion inhibitor, a powder of cyclohexylamine chromate, the amount of which was 0.2 percent of the wire weight.

The welding wire kept in this chamber over a week, had no traces of corrosion. In welding, this wire produced dense, well formed welds having no faults, a minimum splashing of the electrode metal being observed.

Example 2

A conventional welding wire with a composition specified in Example 1, lost its welding and production properties after three weeks of keeping it in storage conditions.

In a welding wire, whose core included, according to the invention, a powder of a vapor-phase corrosion inhibitor, dicyclohexylamine nitrite, in an amount of 0.1 percent of the wire weight, no traces of corrosion were found on the steel tube and the metal constituents of the core even after a year of storing it in the same conditions.

The welding and production properties of the wire in the latter case remained unchanged.

The gas content in a metal weld produced using the proposed welding wire in accordance with this invention after a year of storage, and the gas content of a weld produced with a reference wire, i.e., containing no corrosion inhibitor and used right after its manufacture, were determined and found to be approximately equal, as shown by the data given in the following table.

| Welding wire | Gas content in weld on metal | |
|---|---|---|
| | $H_2$, % | $N_2$, % |
| reference wire | (0.000565–0.00081)/(0.00066) | (0.017–0.030)/(0.022) |
| proposed wire | (0.00057–0.0007)/(0.00062) | (0.021–0.029)/(0.023) |

Note: the cited content of hydrogen $H_2$ is the value determined in weld metal right after welding. In the numerical data given in the table, the numerator gives the extremes of five values of the content of respective gas in the metal of the welded seam, and the denominator gives the average of these five values.

Example 3

A welding wire, the core of which comprises iron powder, and powders of ferroalloys and of ore and mineral constituents (rutile concentrate, fluorspar, alumina, marble, soda ash) was stored unpacked under a shed.

After 2 days of storing traces of corrosion were found on the surface of the steel tube and on the metal constituents of the core. Welding with such wire resulted in coarse-rippled welds, increased splashing of the electrode metal, and poor separation of the slag shell from the weld surface.

The proposed welding wire of a similar composition, but comprising in its core, according to the invention, a vapor-phase corrosion inhibitor — dicyclohexylamine nitrite — in an amount of 0.05 percent of the wire weight, after storing it for half a year in the above mentioned conditions had no spots of corrosion. Welding with this wire featured well formed welds, small losses of splashed metal, easy separation of the slag crust, i.e., the high welding and production properties of the wire remained unchanged during the long period of storing it in the described conditions.

What we claim is:

1. In a welding wire for steel welding and built-up welding, having a steel tube and a core filling said tube and comprising: iron powder, powders of metals and their alloys, gas forming and slag forming materials, and materials stabilizing the arc in the course of welding and built-up welding, the improvement of incorporating in said core filling cyclohexylamine chromate as a vapor-phase corrosion inhibitor, said inhibitor being added to the core filling as a powder in the amount of 0.01 – 0.50 percent of the total weight of the welding wire.

* * * * *